(12) United States Patent
Bonmatí Sempere

(10) Patent No.: US 12,527,525 B2
(45) Date of Patent: Jan. 20, 2026

(54) COMMUNICATION METHOD FOR COMMUNICATING MONITORING DATA AND MONITORING SYSTEM

(71) Applicant: DINDOG TECH, S.L., Barcelona (ES)

(72) Inventor: Talía Bonmatí Sempere, Barcelona (ES)

(73) Assignee: DINDOG TECH, S.L., Barcelona (ES)

( * ) Notice: Subject to any disclaimer, the term of this patent is extended or adjusted under 35 U.S.C. 154(b) by 664 days.

(21) Appl. No.: 17/927,943

(22) PCT Filed: May 27, 2021

(86) PCT No.: PCT/EP2021/064178
§ 371 (c)(1),
(2) Date: Nov. 28, 2022

(87) PCT Pub. No.: WO2021/239870
PCT Pub. Date: Dec. 2, 2021

(65) Prior Publication Data
US 2023/0218237 A1    Jul. 13, 2023

(30) Foreign Application Priority Data
May 28, 2020    (ES) .............................. ES202030493

(51) Int. Cl.
*A61B 5/00*    (2006.01)
*A61B 5/0205*    (2006.01)

(52) U.S. Cl.
CPC ........ *A61B 5/7228* (2013.01); *A61B 5/02055* (2013.01); *A61B 5/7235* (2013.01)

(58) Field of Classification Search
CPC . A61B 5/7228; A61B 5/02055; A61B 5/7235; A61B 5/0015; A61B 5/0022; A61B 5/0024
See application file for complete search history.

(56) References Cited

U.S. PATENT DOCUMENTS

2016/0296124 A1   10/2016   Wegerich et al.
2020/0033426 A1   1/2020    Stemmer

FOREIGN PATENT DOCUMENTS

EP         2417905        2/2012
WO    WO 2007/050037     5/2007
(Continued)

OTHER PUBLICATIONS

International Preliminary Report on Patentability for PCT/EP2021/064178. Mailed Sep. 26, 2022 11 pages.
(Continued)

*Primary Examiner* — Lynsey C Eiseman
*Assistant Examiner* — James Moss
(74) *Attorney, Agent, or Firm* — Casimir Jones, S.C.; Brian F. Bradley

(57) ABSTRACT

The invention relates to a communication method for communicating monitoring data between a monitoring device (4) and processing means (6), wherein the monitoring device (4) is configured for receiving the monitoring data. The method comprises the steps of sending a byte frame to the processing means (6), storing the byte frame, ordering the byte frame by separating the frame into respiratory rate bytes, heart rate bytes and additional bytes, and repeating the previous steps with a predetermined frequency until the processing means have received a heart rate data set, a respiratory rate data set, and an additional data set. The processing means create heart rate information from the heart rate data set and create respiratory rate information from the respiratory rate data set and display them to a user.

10 Claims, 3 Drawing Sheets

(56) References Cited

FOREIGN PATENT DOCUMENTS

| WO | WO 2011/034881 | 3/2011 |
| WO | WO 2019/030746 | 2/2019 |
| WO | WO 2020/019358 | 1/2020 |

OTHER PUBLICATIONS

International Search Report and Written Opinion for PCT/EP2021/064178. Mailed Oct. 1, 2022. 19 pages.

Tompkins, ed. Biomedical Digital Signal Processing passage. Biomedical Digital Signal Processing. C-Language Examples and Laboratory Experiments for the IBM Pc. Jan. 1, 1993. pp. 47 and 247-258.

Jeyhani et al., Comparison of simple algorithms for estimating respiration rate from electrical impedance pneumography signals in wearable devices. Health and Technology, 2016. 7(1), 21-31.

COMMUNICATION METHOD FOR COMMUNICATING MONITORING DATA AND MONITORING SYSTEM

FIELD OF THE INVENTION

The present invention relates to the field of methods and apparatus for monitoring the vital signs of an individual.

BACKGROUND OF THE INVENTION

Monitoring the vital signs is a key factor in strictly tracking the clinical condition of a critical patient, although the level of severity will determine the use of a more or less complex and invasive monitoring and, therefore, the variables that will need to be monitored.

With respect to non-invasive monitoring, the most common vital parameters to be measured are the electrocardiogram, heart rate, respiratory rate, blood pressure, peripheral body temperature and oxygen saturation.

There are different types of devices which will show the digital value of each parameter and its graphic representation. It is common to find multi-parameter monitors which, with a single device, allow all variables to be assessed. These monitors are particularly useful when there is a need to obtain values in a continuous and relatively prolonged manner which makes them very valuable in monitoring an anesthetized patient and monitoring in intensive care units.

In fact, in the particular case of the electrocardiogram (ECG), for example, there are different devices, in addition to multi-parameter monitors, which allow it to be assessed. On one hand, there are clinical electrocardiographs which are devised for isolated analysis and are usually bulky and not transportable. A Holter monitor and event monitors are devised for a more prolonged monitoring, including for trips made by the patient, so these devices are usually lightweight and small sized. However, they have the drawback that the information about the patient is not obtained in real time, but rather the information must be downloaded later in order to be then analyzed by means of specific software. All devices that record an ECG are capable of extracting the heart rate value from said device even though they do not all record a progression of this parameter over time. Furthermore, these devices often have some kind of arrhythmia analysis.

With respect to the respiratory rate assessment, one of the most commonly used techniques in the capnography, which allows not only the respiratory rate but also $CO_2$ concentration in expired air to be monitored. Its use is fundamentally linked to multi-parameter monitors and generally in intubated patients, although it can be used in non-intubated patients by means of using a specific probe.

As for temperature, there is the option of a manual measurement by means of the conventional mercury or infrared thermometer. In cases where a more prolonged monitoring is required, the use of multi-parameter monitors is fairly common and these monitors usually involve using invasive (rectal, esophageal, etc.) probes.

Lastly, oxygen saturation can be assessed by means of a blood gas analysis, although this requires an arterial puncture, and its use is generally for the purpose of obtaining an isolated value. For continuous monitoring of this parameter, the use of pulse oximetry, which works as a result of the optical properties of the hemo group in hemoglobin, which changes from red to blue depending on the oxygen content, is preferred.

There are currently portable, small sized pulse oximeters which can be used in a wide range of situations. It is also common for pulse oximetry to be part of the variables measured by multi-parameter monitors.

US 2016/296124 A1 discloses a system for monitoring human health comprising a wearable torso device and a peripheral device in wireless connectivity with said torso device. The peripheral device accumulates data packets in a first circular buffer and periodically transmits at least one data packet to said torso device and upon acknowledgement that the transmitted packet was received by said torso device.

WO 2011/034881 A1 discloses a body-worn monitor receiving a digital data stream from an ECG system. The ECG system comprises a connecting portion connected to multiple electrodes worn by the patient, a differential amplifier that receives electrical signals and processes them to generate an analog ECG waveform, an analog-to-digital converter and a transceiver that transmits a digital data stream to the processing system.

Given the large amount of data generated by all the sensors mentioned above, there are no known portable devices capable of reporting all this data in real time to a remote monitoring station. This makes it difficult to remotely track patients and requires either the presence of a doctor or the differed tracking of the individual's vital signs, which may cause delays in the diagnosis of problems associated with same.

BRIEF DESCRIPTION OF THE INVENTION

The present invention provides a solution to the problem proposed above by means of a communication method for communicating monitoring data according to claim 1 and a monitoring system according to claim 10. The dependent claims define preferred embodiments of the invention.

Unless otherwise defined, all the terms (both scientific and technical terms) used herein must be interpreted as a person skilled in the art would interpret them. It will therefore be understood that the commonly used terms must be interpreted as one who is knowledgeable in the subject matter would, and not in an idealized or strictly formal manner.

Throughout the text, the word "comprises" (and its derivatives such as "comprising") must not be understood in an exclusive manner, but rather must be understood so as to allow for the possibility that what has been defined may include additional elements or steps.

One object of the present invention relates to a communication method for communicating monitoring data between a monitoring device and processing means, wherein the monitoring device is configured for receiving the monitoring data, the monitoring data comprising at least heart rate data, respiratory rate data and additional data, the method comprising the steps of the monitoring device receiving a first heart signal sample value and a first respiratory signal sample value and storing both first values;

the monitoring device receiving, with a first frequency f1, a plurality of heart signal sample values and a plurality of respiratory signal sample values and storing, for each signal sample value, the difference between the value of each signal sample and the value of the preceding signal sample, for both the heart and respiratory signals;

the monitoring device creating, with a second frequency f2, lower than a half of the first frequency f1, a data frame comprising a plurality of heart signal value differences and a plurality of respiratory signal value differences the monitoring device sending, with a third frequency f3, a plurality of data frames to the processing means the monitoring device sending, with a fourth frequency f4, a plurality of additional data, contained in the delivery of one of the data frames together with a header identifying the type of additional datum the processing means receiving and ordering the data frame by separating the data frame into respiratory signal value differences data with their corresponding frequencies, heart signal value differences data with their corresponding frequencies and additional data;

the processing means transforming the respiratory signal value differences data into respiratory signal sample values data the processing means transforming the heart signal value differences data into heart signal sample values data the processing means creating heart rate information from the heart signal sample values data set and displaying it to a user the processing means creating respiratory rate information from the respiratory signal sample values data set and displaying it to a user.

As a result of this method, data about the heart rate and respiratory rate of a user can be obtained by means of a simple device, such that the obtained data is updated in real time and can be received by a healthcare professional located remotely. The main difference between this method and other transmission methods is the pre-processing and ordering of the data in data frames: there is a very large volume of data to be transmitted, as not just isolated heart and respiratory rate data is transmitted, but rather all the signal sample data received by the sensors is transmitted, which allows the processing means to create information about the heart and respiratory rate. In the case of the present invention, the data is not processed in the monitoring device; it is simply stored in a suitable manner and prepared for transmission. This allows substantial savings in power consumption, while maintaining the possibility of analyzing the complete signal from the sensors. The battery can therefore be smaller, and the device can be more manageable.

In particular embodiments, the second frequency is 16 times less than the first frequency, the third frequency is 8 times less than the second frequency and the fourth frequency is less than the third frequency.

A data delivery frequency that is agile enough so as to be enable obtaining data in real time but with a power consumption that is low enough so as to prolong the autonomy of the apparatus is thereby achieved.

In particular embodiments, the first frequency is 125 Hz, the second frequency is 7.8125 Hz, the third frequency is 0.9765625 Hz, and the fourth frequency is less than 0.9 Hz.

A data update frequency close to 1 Hz is thereby obtained, which is enough so as to enable analyzing the biometric data provided by the apparatus.

In particular embodiments, the method further comprises the step of creating additional information from the additional data set and displaying it to a user.

A user located remotely can thereby visualize the data obtained in this method.

In particular embodiments, the additional data comprises temperature data and/or oximetry data and/or activity and position data and/or monitoring device battery level data.

This data is also important and complementary to the heart rate data and respiratory rate data, such that the healthcare professional can have better control of the user's situation.

In particular embodiments, the method further comprises the step of verifying the integrity of the data frame before creating information.

It is thereby ensured that the data obtained is correct before carrying out data processing.

In particular embodiments, the processing means transform the heart sample value differences by using the first heart signal sample value and successively summing the heart signal values differences, thus obtaining a plurality of heart signal sample values the processing means filter the heart signal sample values data set, obtaining a plurality of frequencies and maximize the amplitude of one of the frequencies received the processing means obtain the peaks of the signal of the maximized frequency the processing means obtain a heart rate datum from the peaks.

This particular method allows the heart rate to be obtained in a simple and reliable manner.

In particular embodiments, the processing means transform the respiratory sample value differences by using the first respiratory signal sample value and successively summing the respiratory signal values differences, thus obtaining a plurality of respiratory signal sample values the processing means identify acceptable rising edges and falling edges in the respiratory signal sample values data set by means of estimating times between edges the processing means obtain a respiratory rate datum as the difference between two acceptable rising edges.

This particular method allows the respiratory rate to be obtained in a simple and reliable manner.

In particular embodiments, the processing means send the heart rate information and the respiratory rate information to a network server.

This data can thereby be stored or sent to other servers, such that it is available wherever the user chooses.

In a second inventive aspect, the invention relates to a monitoring device, comprising at least three electrocardiogram sensors;

a temperature sensor;

a pulse oximetry sensor; and a monitoring device configured for receiving data from the electrocardiogram sensors, from the temperature sensor and from the pulse oximetry sensor, and configured for communicating a byte frame by means of an output port processing means configured for carrying out the steps of a method according to the first inventive aspect.

This device can be readily worn by a user and allows the aforementioned advantages to be obtained.

In particular embodiments, the processing means comprise a plurality of additional band-pass filters arranged for filtering the heart signal sample values data set, and a plurality of processing circuits, wherein a first processing circuit is configured for filtering the heart signal sample values data set by maximizing the amplitude of one of the rates received, obtaining the peaks of the signal of the amplified rate, and obtaining a heart rate datum from the peaks.

In particular embodiments, the processing means comprise a plurality of pneumography circuits, wherein a first pneumography circuit is configured for comparing the filtered signal with a predetermined datum and a second pneumography circuit is configured for receiving the signal from the first pneumography circuit, detecting a first edge, saving a first time instant corresponding to the first edge, performing a wait for a time window equal to the minimum detectable window, detecting a second edge, saving a second time instant corresponding to the second edge, and comparing the first time instant and the second time instant, thus obtaining a respiratory rate datum.

DESCRIPTION OF THE FIGURES

To complete the description and facilitate greater understanding of the invention, a set of figures is attached to the description. These figures are part of the description and illustrate a particular example of the invention, which must not be interpreted as being limiting of the scope thereof, but rather as a mere example of how the invention can be carried out. This set of figures comprises the following.

For the purpose of aiding to better understand the technical features of the invention, the mentioned Figures are accompanied by a series of reference numbers which, in an illustrative and non-limiting manner, depict the following:

| | |
|---|---|
| 1 | Electrocardiogram sensors |
| 2 | Temperature sensor |
| 3 | Pulse oximetry sensor |
| 4 | Monitoring device |
| 5 | Wireless communication module |
| 6 | Control center |
| 7 | Access terminal |
| 10 | Monitoring system |

DETAILED DESCRIPTION OF THE INVENTION

A preferred embodiment of the present invention, provided for illustrative purposes but without limiting same, is described below.

Figure 1:
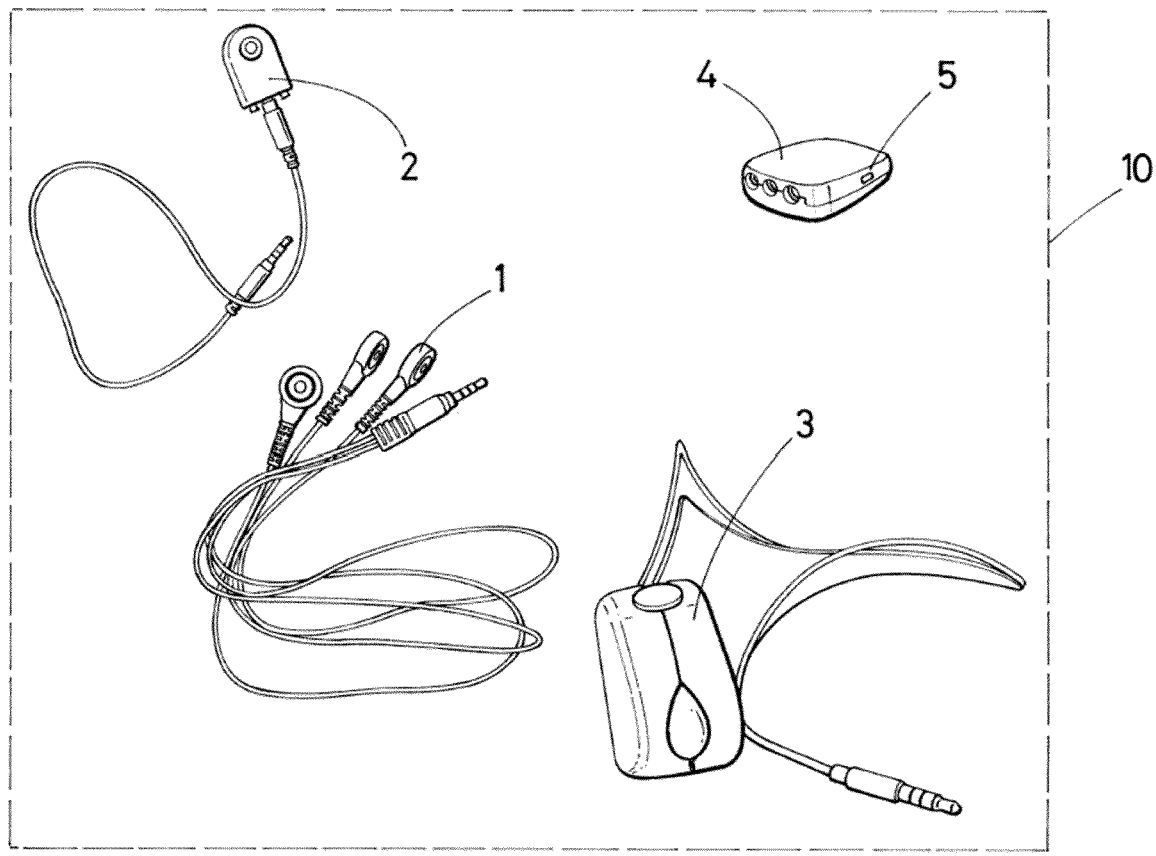
FIG. 1 shows a monitoring system according to a particular embodiment of the invention.

FIG. 1 shows a monitoring system 10 according to a particular embodiment of the invention.

This system 10 comprises the following elements:
three electrocardiogram sensors 1;
a temperature sensor 2;
a pulse oximetry sensor 3; and
a monitoring device 4
a control center (not depicted in this figure).

The monitoring device 4 is configured for receiving data from the electrocardiogram sensors 1, from the temperature sensor 2 and from the pulse oximetry sensor 3, and configured for communicating a byte frame series to the control center by means of a wireless emission port.

The monitoring device 4 comprises a microcontroller which receives signals from the connectors of the sensors, from an ambient microphone, from an ambient thermometer and from the inertial measurement unit. Furthermore, it has the typical elements of a portable device, such as a battery, with its monitor and charging system, current transformer, and wireless communication module 5.

This system operates according to a monitoring method wherein the monitoring device receives the signal from the different sensors and emits it to the control center.

Figure 2:
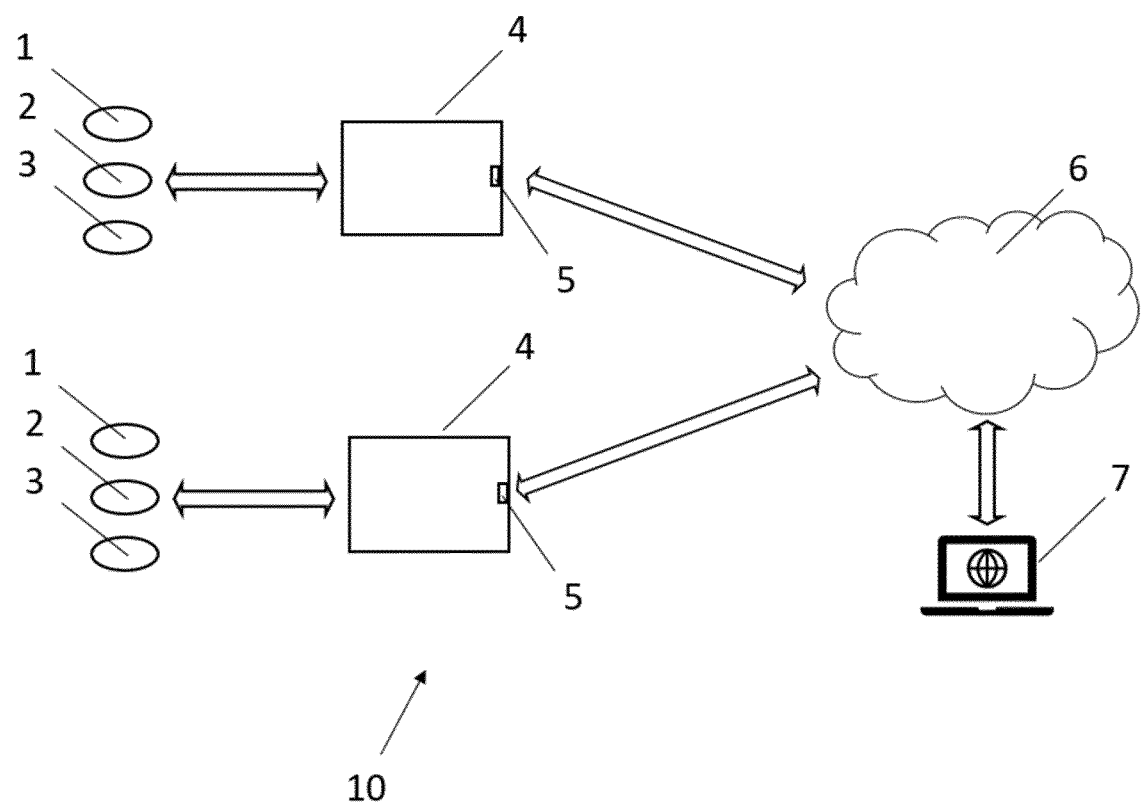
FIG. 2 shows a series of steps of a particular embodiment of a control method according to the invention.
Figure 3:
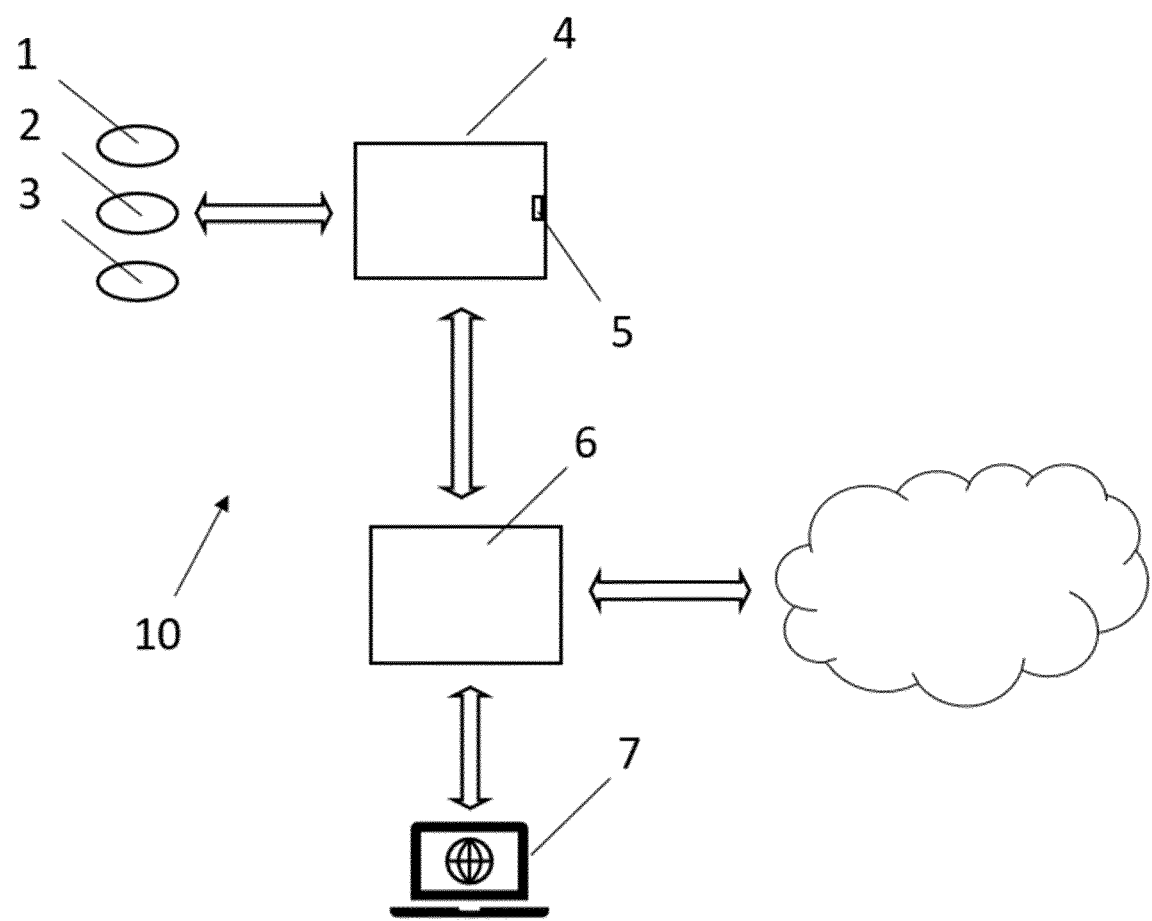
FIG. 3 shows a series of steps of an alternative embodiment of a control method according to the invention.

This operation is observed in FIGS. 2 and 3. The difference between both is the position of the control center 6, which is in the cloud in FIG. 2 while in FIG. 3 it is located in a local server. As for the steps of the method described below, they are all compatibles with both options.

Once the monitoring device receives the data from the sensors 1, 2, the device 4 orders said data and creates data frames, which are subsequently emitted to the control center 6 by means of its wireless port 5.

The process of creating the data frame comprises the following steps:
the monitoring device receiving, with a frequency of 125 Hz, heart signal sample values and respiratory signal sample values
the monitoring device storing the first values, and then storing the difference between each sample value and the previous sample value.

Thus, for a series of sample values $x1, x2, x3, x4, x5\ldots$ the stored values will correspond to the first value and to successive differences $x1, (x2-x1), (x3-x2), (x4-x3), (x5-x4)\ldots$. As the differences between values are much smaller than the real values, the stored data set is less than the initial data set.

With a frequency of 7.8125 Hz, the monitoring device creates a data frame comprising these value differences, both for the heart signal values and for the respiratory signal values. Data frames are sent to the processing means every 1024 ms.

The control center 6 stores these byte frames as they are received and separates them into respiratory rate bytes, heart rate bytes, temperature bytes, oximetry bytes, and activity and position bytes.

Thus, every 1024 ms, the processing means receive a plurality of data frames, in which frames there is data which allows the original data of the heart and respiratory signal sensors to be reconstructed.

Furthermore, in some of the frames, the monitoring device sends a plurality of additional data (temperature, oximetry data, activity and position data, monitoring device battery level data), together with a header identifying the type of additional datum.

Obviously, when using the data transmission system in the cloud, the step of processing data can be performed both in the receiver and in the cloud, depend on the final user's needs. If, at any time, the communication module 5 loses the connection with the control center 6, the monitor 4 stores all this data in its internal memory until it connects again with the control center 6. Once the reconnection occurs, it can both continue to send the information in real time and dump that internally stored information.

Therefore, the control center receives a byte string in which each byte is intended for each of the measurements.

When the control center has received sufficient strings, it verifies the integrity thereof and processes each of the data sets separately.

As for heart signal values differences data set, the control center receives the signal value differences coming from the monitoring device, formed by eight byte frames. This data are used to reconstruct the heart signal sample values, the same as they were received by the monitoring device. Once these data are reconstructed, they are first subjected to a band-pass filter, the upper and lower cut-off frequencies of which have been established to eliminate all the possible artifacts produced by the change in impedance of the electrodes during a movement of a muscle by the patient. The signal resulting from the filter is a signal clean of artifacts which maintains the frequency components necessary for detecting the heart rate.

The signal which governs the heart rate detection algorithm is the R signal, the frequency of which is the highest of the heart signals. To maximize its amplitude, the output signal of the band-pass filters undergoes a derivation and moving average process, sample by sample, in order to even further attenuate the low frequency components of the signal and the result is squared for the purpose of eliminating negative values and highlighting the high frequency components.

After these algorithms, the signal is stable against external disturbances and contains the information needed for calculating the heart rate, given that the R signal has been maximized and its amplitude is considerably higher than that of the rest of the signals.

The algorithm for calculating the heart rate is based on the search for maximums in the signal, which will correspond with the R peaks of the QRS complex. For detecting R peaks, first a maximum is detected in the signal and a threshold based on its value is generated. Next, a wait having a time equivalent to the maximum detectable heart rate is performed, and then the threshold is gradually decreased with a negative exponential coefficient until the threshold intercepts the heart signal again. From the moment of this interception, and during a time window equal to the maximum duration of a QRS complex, the maximum of the signal is searched for, and this maximum will be the R peak and the new initial value of the threshold. To calculate the heart rate, the time instant of the R peak is stored. After this, the entire process is repeated again.

To determine the heart rate in beats per minute, the time between R peaks is evaluated and a number of these peaks are calculated as a moving average. Once the mean RR time has been obtained, it is converted to minutes and the information is sent so that the user can visualize it.

As for respiratory signal values differences set, the control center receives the respiratory signal values differences data set coming from the monitoring device, formed by eight byte frames. This data are used to reconstruct the respiratory signal sample values, the same as they were received by the monitoring device. Once these data are reconstructed, they are previously conditioned by means of a series of band-pass filters which eliminate those rates that are above and below the maximum and minimum detectable respiratory rates. Then the battery of detection algorithms is applied.

First, if a sample of the respiratory signal is less than a value obtained in an experimental manner, that sample will have nil value. The signal is thereby converted into unipolar, and a small minimum value threshold is applied. The signal obtained at the output of the filter is processed in the respiratory rate detector. The operation thereof is based on the following rules:

a rising edge of the signal is detected and the time instant thereof is saved;
next, a wait for a minimum time window equal to the time value of the maximum detectable respiratory rate is performed;
a falling edge is detected and the time instant thereof is saved. If the time difference between the falling edge and the rising edge is greater than the time value of the minimum detectable respiratory rate, both the rising edge and the falling edge are discarded, and the detection algorithm is started again;
a wait for a minimum time window equal to the time value of the maximum detectable respiratory rate is performed;
a new rising edge is detected and the time instant thereof is saved. If the time difference between this rising edge and the previous falling edge is greater than the time value of the minimum detectable respiratory rate, it is all discarded and the detection algorithm is started again;
a wait for a minimum time window equal to the time value of the maximum detectable respiratory rate is performed;
a new falling edge is detected and the time instant thereof is saved. If the time difference between this falling edge and the rising edge is greater than the minimum detectable respiratory rate, it is all discarded and the detection algorithm is started again;
it is verified that the time between the last two falling edges and the last two rising edges is similar. If they differ a lot, the algorithm is started again. Otherwise, the first respiratory rate value has been obtained.

The algorithm has therefore been initialized. From this moment, it is applied iteratively with the same patterns described and with the additional feature of verifying that the time difference between edges in the same direction is similar. Otherwise, the algorithm is started again.

To compute the partial respiratory rate, three respiratory waves that have met the mentioned restrictions must be obtained. Once the first partial respiratory rate has been calculated, the following are obtained in each iteration of the algorithm.

As a basis for the algorithm, three respiratory rate detectors with different bandwidths are applied. Low respiratory rate signals are detected in a first detector; high respiratory rate signals are detected in a second detector; and the entire spectrum of rates are detected in a third detector.

Fast Fourier transform (FFT) is further applied to the respiratory signal in moving windows of 32 seconds. Four respiratory rate values will thus be obtained, where two of them must be similar in order to be validated and in order to be able to show a respiratory rate value to the user.

Once the control center has processed the data, said data can be consulted from an access terminal, such as a personal computer 7. In the case of FIG. 2, the computer 7 has a network connection, such that it can be connected with the data contained in the control center 6 located in the cloud, downloading the data in real time. Conversely, in FIG. 3, the computer 7 is local, receiving the data from the control center 6 which is also local. The cloud is used to make backup copies of said data.

As a result of the use of this method, the correct calculation of the respiratory rate is obtained under various conditions, wherein the use of a single monolithic algorithm would have required enormous complexity and use of resources to enable handling all the possible cases.

Obtaining the respiratory rate by means of this method is non-invasive and allows automatic information about this parameter to be obtained in non-intubated patients, which is advantageous with respect to conventional measurement methods (done by hand by means of visual calculation or automatically by means of assisted ventilation apparatus).

The invention claimed is:
1. A communication method for communicating monitoring data between a monitoring device (4) and processing means (6), wherein the monitoring device (4) is configured for receiving the monitoring data, the monitoring data com- prising at least heart rate data, respiratory rate data and additional data, the method comprising the steps of the monitoring device (4) receiving a first heart signal sample value and a first respiratory signal sample value and storing both first values;

the monitoring device (4) receiving, with a first frequency f1, a plurality of heart signal sample values and a plurality of respiratory signal sample values and storing, for each signal sample value, the difference between the value of each signal sample and the value of the preceding signal sample, for both the heart and respiratory signals;

the monitoring device (4) creating, with a second frequency f2, lower than a half of the first frequency f1, a data frame comprising a plurality of heart signal value differences and a plurality of respiratory signal value differences the monitoring device sending (4), with a third frequency f3, a plurality of data frames to the processing means (6)

the monitoring device (4) sending, with a fourth frequency f4, a plurality of additional data, contained in the delivery of one of the data frames together with a header identifying the type of additional datum the processing means (6) receiving and ordering the data frame by separating the data frame into respiratory signal value differences data with their corresponding frequencies, heart signal value differences data with their corresponding frequencies and additional data;

the processing means (6) transforming the respiratory signal value differences data into respiratory signal sample values data the processing means (6) transforming the heart signal value differences data into heart signal sample values data the processing means (6) creating heart rate information from the heart signal sample values data set and displaying it to a user the processing means (6) creating respiratory rate information from the respiratory signal sample values data set and displaying it to a user.

2. The method according to claim 1, wherein the second frequency is 16 times less than the first frequency, the third frequency is 8 times less than the second frequency and the fourth frequency is less than the third frequency.

3. The method according to claim 2, wherein the first frequency is 125 Hz, the second frequency is 7.8125 Hz, the third frequency is 0.9765625 Hz, and the fourth frequency is less than 0.9 Hz.

4. The method according to claim 1, further comprising the step of creating additional information from the additional data set and displaying it to a user.

5. The method according to claim 1, wherein the additional data comprises temperature data and/or oximetry data and/or activity and position data and/or monitoring device battery level data.

6. The method according to claim 1, wherein the step of creating heart rate information comprises the steps of the processing means (6) transform the heart sample value differences by using the first heart signal sample value and successively summing the heart signal values differences, thus obtaining a plurality of heart signal sample values the processing means (6) filter the heart signal sample values data set by means of a band-pass filter, obtaining, amongst others, a R-signal and maximize the amplitude of the R-signal by a derivation and moving average process, followed by a squaring the maximized R-signal the processing means (6) obtain the peaks of the R-signal by detecting a maximum, generating a threshold value, waiting for a time and decreasing the threshold value until the threshold intercepts the signal value again, repeating this step to obtain the peaks the processing means obtain a heart rate datum from the peaks.

7. The method according to claim 1, wherein the step of creating respiratory rate information comprises the steps of the processing means (6) transform the respiratory sample value differences by using the first respiratory signal sample value and successively summing the respiratory signal values differences, thus obtaining a plurality of respiratory signal sample values the processing means (6) identify acceptable rising edges and falling edges in the respiratory signal sample values data set by means of estimating times between edges the processing means (6) obtain a respiratory rate datum as the difference between two acceptable rising edges wherein the estimation of time between edges is performed by the following steps comparing the respiratory signal sample values with a predetermined datum until a first rising edge is detected, saving the time of the first rising edge waiting for a time window corresponding to a maximum detectable rate of the system detecting a first falling edge, saving the time of the first falling edge, comparing the difference of saved times between the first rising edge and the first falling edge to verify if the difference is greater than the maximum detectable rate of the system waiting for a time window corresponding to a maximum detectable rate of the system detecting a new rising edge, saving the time of the new rising edge, comparing the difference of saved times between the first falling edge and the new rising edge to verify if the difference is greater than the maximum detectable rate of the system waiting for a time window corresponding to a maximum detectable rate of the system detecting a new falling edge, saving the time of the new falling edge, comparing the difference of saved times between the new falling edge and the new rising edge to verify if the difference is greater than the maximum detectable rate of the system verifying that the difference between consecutive falling edges and consecutive rising edges is similar applying iteratively these steps to update the respiratory rate.

8. The method according to claim 1, wherein the processing means (6) send the heart rate information and the respiratory rate information to a network server.

9. A monitoring system (10), comprising at least three electrocardiogram sensors (1);

a temperature sensor (2);

a pulse oximetry sensor (3); and a monitoring device (4) configured for receiving data from the electrocardiogram sensors, from the temperature sensor and from the pulse oximetry sensor, and configured for communicating a byte frame by means of an output port (5)

processing means (6) configured for carrying out the steps of a communication method for communicating monitoring data between a monitoring device (4) and processing means (6), wherein the monitoring device (4) is configured for receiving the monitoring data, the monitoring data comprising at least heart rate data, respiratory rate data and additional data, the method comprising the steps of the monitoring device (4) receiving a first heart signal sample value and a first respiratory signal sample value and storing both first values;

the monitoring device (4) receiving, with a first frequency f1, a plurality of heart signal sample values and a plurality of respiratory signal sample values and storing, for each signal sample value, the difference between the value of each signal sample and the value of the preceding signal sample, for both the heart and respiratory signals;

the monitoring device (4) creating, with a second frequency f2, lower than a half of the first frequency f1, a data frame comprising a plurality of heart signal value differences and a plurality of respiratory signal value differences the monitoring device sending (4), with a third frequency f3, a plurality of data frames to the processing means (6)

the monitoring device (4) sending, with a fourth frequency f4, a plurality of additional data, contained in the delivery of one of the data frames together with a header identifying the type of additional datum the processing means (6) receiving and ordering the data frame by separating the data frame into respiratory signal value differences data with their corresponding frequencies, heart signal value differences data with their corresponding frequencies and additional data;

the processing means (6) transforming the respiratory signal value differences data into respiratory signal sample values data the processing means (6) transforming the heart signal value differences data into heart signal sample values data the processing means (6) creating heart rate information from the heart signal sample values data set and displaying it to a user the processing means (6) creating respiratory rate information from the respiratory signal sample values data set and displaying it to a user.

10. The monitoring system according to claim 9, wherein the processing means (6) comprise a plurality of pneumography circuits, and are configured to perform the step of creating respiratory rate information comprising the steps of:

the processing means (6) transform the respiratory sample value differences by using the first respiratory signal sample value and successively summing the respiratory signal values differences, thus obtaining a plurality of respiratory signal sample values the processing means (6) identify acceptable rising edges and falling edges in the respiratory signal sample values data set by means of estimating times between edges the processing means (6) obtain a respiratory rate datum as the difference between two acceptable rising edges wherein the estimation of time between edges is performed by the following steps comparing the respiratory signal sample values with a predetermined datum until a first rising edge is detected, saving the time of the first rising edge waiting for a time window corresponding to a maximum detectable rate of the system detecting a first falling edge, saving the time of the first falling edge, comparing the difference of saved times between the first rising edge and the first falling edge to verify if the difference is greater than the maximum detectable rate of the system waiting for a time window corresponding to a maximum detectable rate of the system detecting a new rising edge, saving the time of the new rising edge, comparing the difference of saved times between the first falling edge and the new rising edge to verify if the difference is greater than the maximum detectable rate of the system waiting for a time window corresponding to a maximum detectable rate of the system detecting a new falling edge, saving the time of the new falling edge, comparing the difference of saved times between the new falling edge and the new rising edge to verify if the difference is greater than the maximum detectable rate of the system verifying that the difference between consecutive falling edges and consecutive rising edges is similar applying iteratively these steps to update the respiratory rate.

* * * * *